3 Sheets—Sheet 1

W. H. BRYANT.

CHANNELING MACHINE.

No. 11,136. Reissued Dec. 23, 1890.

WITNESSES,
E. B. Gilchrist
M. S. Armstrong.

INVENTOR.
Wm. H. Bryant
H. T. Fisher
ATTORNEY.

THE NORRIS PETERS CO., PHOTO-LITHO., WASHINGTON, D. C.

3 Sheets—Sheet 2.

W. H. BRYANT.

CHANNELING MACHINE.

No. 11,136. Reissued Dec. 23, 1890.

WITNESSES.
E. B. Gilchrist
W. S. Amsbury

INVENTOR.
Wm. H. Bryant
H. T. Fisher
ATTORNEY.

THE NORRIS PETERS CO., PHOTO-LITHO., WASHINGTON, D. C.

3 Sheets—Sheet 3.
W. H. BRYANT.
CHANNELING MACHINE.
No. 11,136. Reissued Dec. 23, 1890.
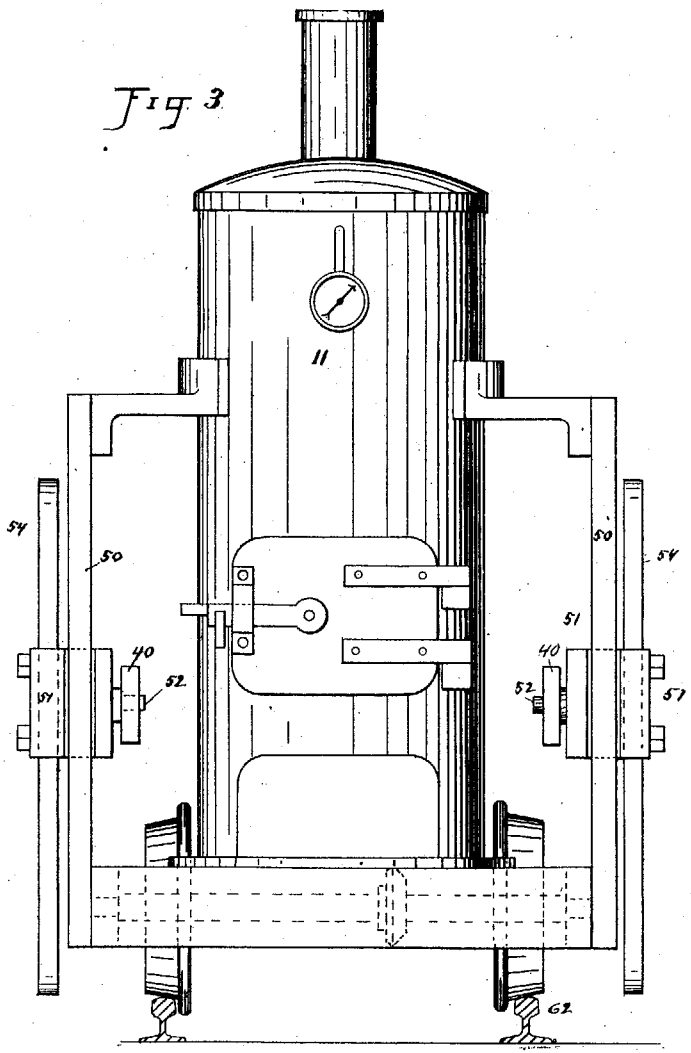
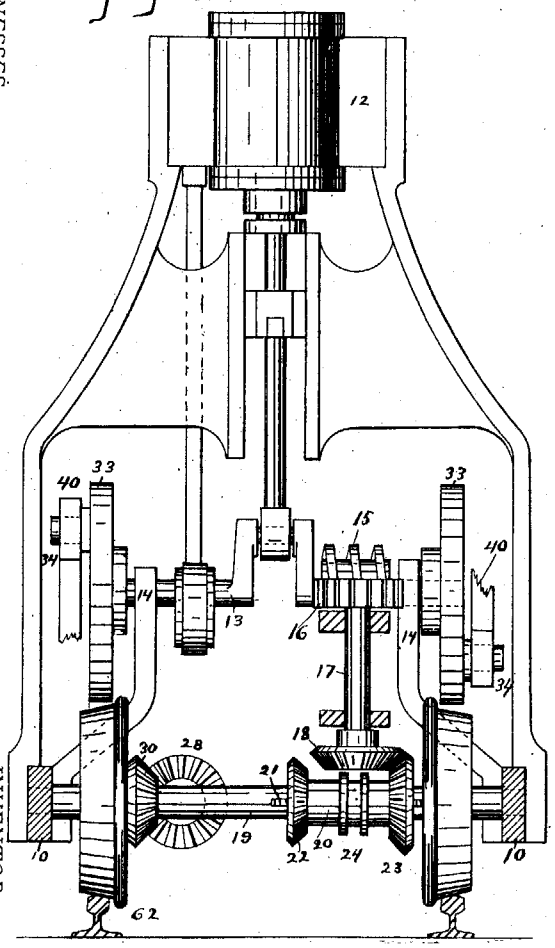
WITNESSES,
E. B. Gilchrist
N. S. Armstrong
INVENTOR
Wm. H. Bryant
H. T. Fisher
ATTORNEY
THE NORRIS PETERS CO., PHOTO-LITHO., WASHINGTON, D. C.

UNITED STATES PATENT OFFICE.

WILLIAM HENRY BRYANT, OF NORTH AMHERST, OHIO.

CHANNELING-MACHINE.

SPECIFICATION forming part of Reissued Letters Patent No. 11,136, dated December 23, 1890.

Original No. 396,462, dated January 22, 1889. Application for reissue filed June 5, 1890. Serial No. 354,403.

*To all whom it may concern:*

Be it known that I, WILLIAM HENRY BRYANT, a citizen of the United States, residing at North Amherst, in the county of Lorain and State of Ohio, have invented certain new and useful Improvements in Channeling-Machines; and I do hereby declare that the following is a full, clear, and exact description of the invention, which will enable others skilled in the art to which it appertains to make and use the same.

This invention relates to a channeling-machine that is designed especially for quarry use, the main objects of the invention being to provide a means for throwing the drills forcibly but yieldingly against the stone, and to provide for the adjustment of the drills, so that they will operate properly irrespective of the depth of the channel.

To the ends above named the invention consists, essentially, of a jointed drill-carrying lever mounted upon an adjustable fulcrum, the two sections of said lever being normally held in the same plane by means of a spring, while the lever is connected to a crank-shaft, whereby a rocking motion is imparted thereto.

Reference is to be had to the accompanying drawings, forming a part of this specification, in which similar figures of reference indicate corresponding parts in all the views.

Figure 1:
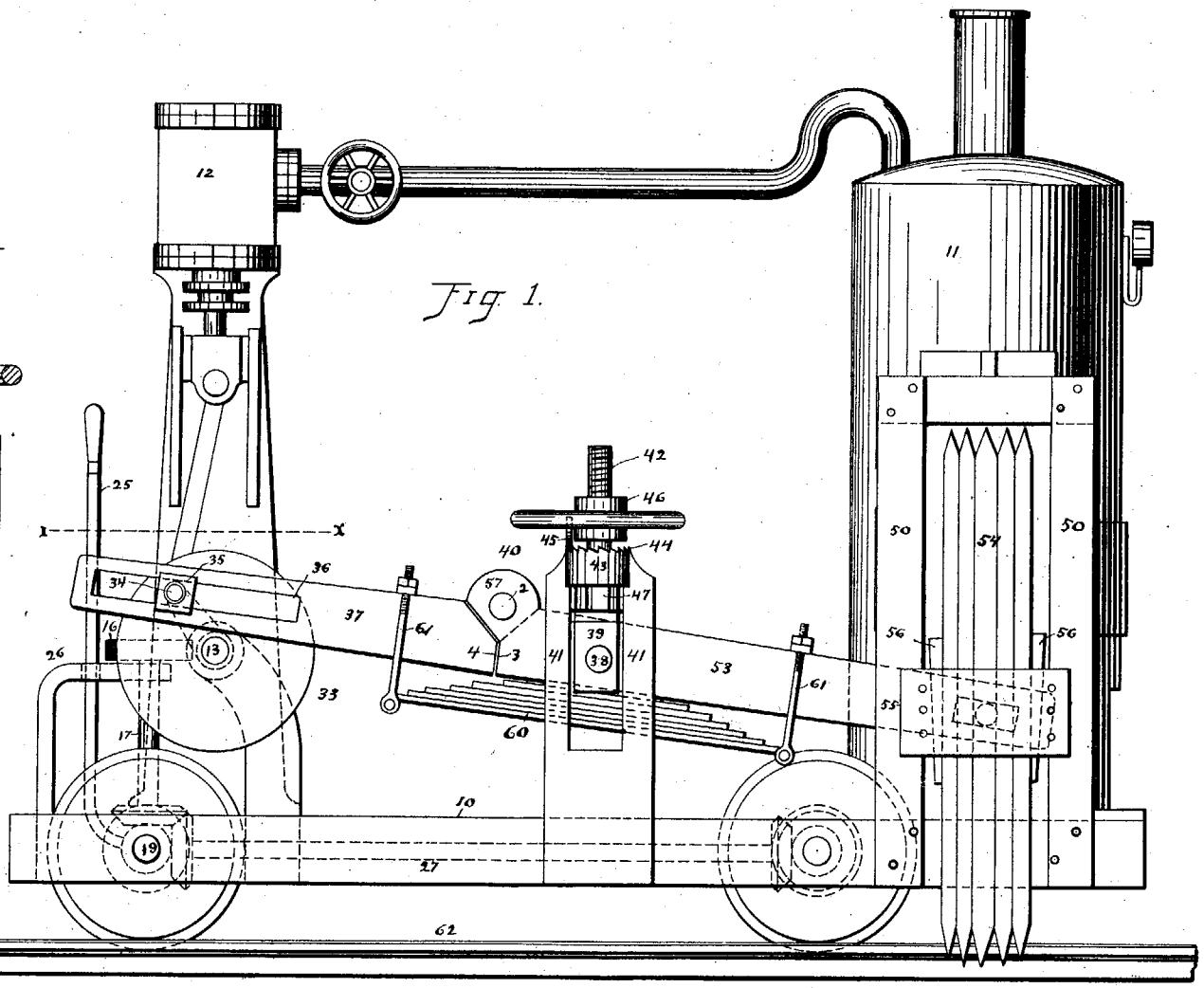
Figure 5:
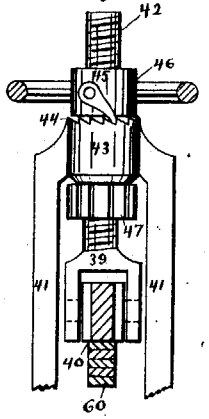
Figure 2:
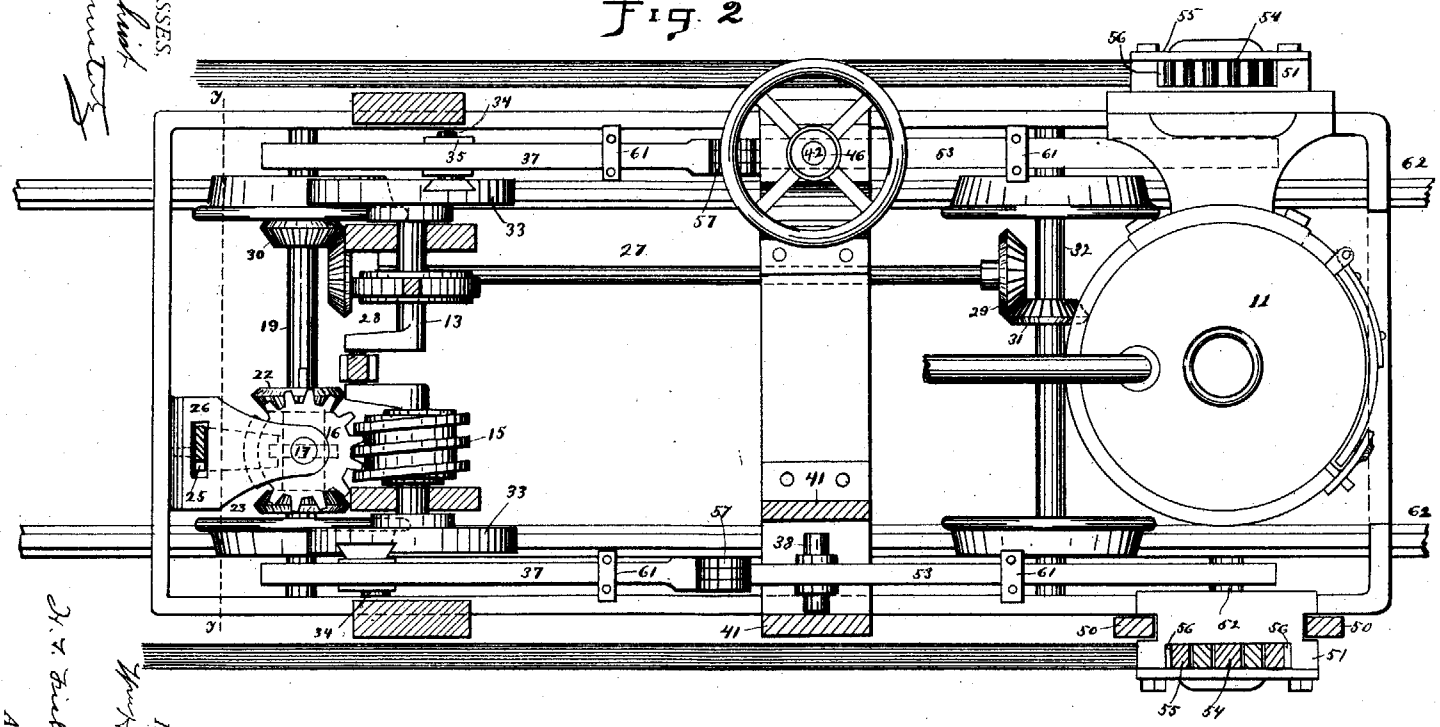

Figure 1 is a side view of my improved channeling-machine. Fig. 2 is a sectional plan view thereof, taken on the line *x x* of Fig. 1. Fig. 3 is a view of the forward end of the machine. Fig. 4 is a sectional view of the rear of the machine, the view being taken on line *y y* of Fig. 2; and Fig. 5 is a detail view of the adjustable lever-fulcrum, the lever and its spring being shown in section.

In the drawings above referred to, 10 represents a truck or vehicle body, upon which there is mounted a boiler 11 and an engine 12, said engine being arranged to drive a crank-shaft 13, that is mounted in bearings supported by standards 14, carried by the truck 10.

Upon the crank-shaft 13 there is fixed a worm-gear 15, which engages a gear 16, carried by a vertical shaft 17, upon the lower end of which shaft there is a bevel-gear 18, said gear being directly above the rear axle 19. Upon this rear axle there is mounted a sleeve 20, which rides upon a feather 21, and to the sleeve there are rigidly connected two bevel-gears 22 and 23. The sleeve 20 carries two collars 24, and the space between these collars is entered by the lower end of a lever 25, which is pivotally supported in a bracket 26. (See Figs. 1 and 2.) By this arrangement it will be seen that by throwing the sleeve 20 so that the two gears 22 and 23 are out of engagement with the gear 18 the axle 19 will not be affected by the rotation of the shaft 17, but that if either of the gears 22 or 23 is thrown into engagement with the gear 18 the machine will be advanced or moved backward in accordance with the direction of the motion of the shaft 13.

In order that the forward axle and the wheels carried thereby may be moved positively at times when the axle 19 is revolved, I mount a longitudinal shaft 27 in the position shown in the drawings, this shaft being provided with bevel-gears 28 and 29, the gear 28 being engaged by a gear 30, carried by the axle 19, while the gear 29 engages a gear 31, that is carried by the forward axle 32. By so driving the two axles positively I increase the frictional contact between the wheels and the rail-treads, and consequently am able to advance the machine up much steeper grades than would be the case if I employed only two driving-wheels.

Upon the ends of the shaft 13 I mount a heavy balance-wheel 33, each wheel being provided with a wrist or crank pin 34, that engages a box 35, arranged to slide in a longitudinal slot 36, formed in the rear section 37 of a jointed lever 40, which lever is in turn mounted upon a fulcrum-pin 38, that is carried by a box 39, said box being connected to a threaded shank 42, which passes upward through a top plate 43, that is carried by slotted standards 41, the box entering the slots formed in the standards. The upper face of the plate 43 is cut to the form of a ratchet 44, which ratchet is engaged by a pawl 45, that is carried by a hand-wheel nut 46, which nut engages the threaded shank 42. By this arrangement I provide for the vertical adjustment of the fulcrum-pin, the shank and the parts carried thereby being held against upward displacement by a jam-nut 47, that is arranged below the plate 43. The peripheral face of the jam-nut 47 is formed with recesses, as shown, in order that it may be engaged by the claws of a spanner-wrench.

At either side and near the forward end of the truck-frame 10 I mount vertical standards 50, which serve as ways or guides for a block 51, which block is provided with a stud or pin 52, that enters a short longitudinal slot formed in the body of the forward section 53 of the lever 40. The outer section of the block 51 is arranged to receive the drills 54, which drills are held to place by plates 55 and wedges 56.

As before stated, the lever 40 is a jointed lever, its joint 57 being located just to the rear of the fulcrum-pin 38. This joint 57 is formed by means of a pivot pin or pintle 2, which passes through interlocking ears formed upon the lever-section, and below this pin the forward section 53 is formed with a bearing-face or shoulder 3, against which there abuts a corresponding shoulder 4, formed on the section 37, the arrangement being such that when the forward end of the lever is being moved upward the motion imparted to the forward lever-section will be positive, while when the forward end of the lever is moving downward the section 53 will be free to swing upon its pivotal connection with the section 37; but in order that the two sections may be normally held in-line I mount a heavy spring 60 just beneath the fulcrum-pin 38, the ends of this spring being held to the lever-sections by shackles 61.

In operation the machine above described is mounted upon a track or way made up of rails 62, and the engine 12 having been started a rotary motion will be imparted to the shaft 13, which motion will act to rock the levers 40 upon their fulcrum-pin, the arrangement being such that as the wrist or crank pins 34 are moving downward a positive upward movement will be imparted to the lever-sections 53; but when the crank or wrist pins 34 are moving upward the lever-sections 53 will be thrown downward, such downward movement, however, not being positive, inasmuch as any undue pressure upon the drill-points will act to throw the lever-sections 53 against the tension of their springs 60, so that by the arrangement hereinbefore described I provide not only for throwing the drills into yielding contact with the stone, but I also provide for the positive lifting of the drills from the channel formed thereby should they tend to jam between the walls of such channel.

When the machine is operated, the truck is alternately advanced and driven back over the rails 62, and as the channel deepens the hand-wheel nuts are turned so as to lower the lever-fulcrum, thus providing for the cutting of a channel equal in depth to the length of the extending ends of the drills.

The movable fulcrum for the levers carrying the drills is one of the important features of the invention, and among the advantages of this movement or adjustment is the fact that it enables the crank-wheels 33, by which the levers are operated, to transmit through said levers a full and uniform blow to the drills at whatever depth they may be working. This would be impossible if the levers operated on a fixed fulcrum, as in that case there would be a varying blow, according to the depths at which the work was being done, until at last when the limit of movement was reached there would be no further work accomplished. With fixed fulcrums there is a certain fixed maximum depth at which such machines will work, and when this depth has been reached it is necessary to stop the machine, loosen the clamps by which the drills are secured, and lower the drills for another four-inch cut. I avoid the long delay of this stopping and secure even and regular blows by providing an adjustable fulcrum, which is lowered in exact correspondence with the gradually-reached lower level of the work. Thus I am enabled to cut a channel fifteen to twenty inches in depth without stopping the machine to make adjustments, while with a stationary fulcrum I could not go lower than four inches without stopping, and then my machine would at best be doing unequal work according as it was working on the surface or lower down.

Another important element of the invention is the aligned sectional lever for operating the drills. Among the advantages of this construction of lever may be mentioned the promptness with which the drills are picked up after each stroke, thus avoiding obstruction to the feed movement of the machine. It will be understood that there is a constant regular feed of the machine whichever way it is cutting, and the drills having been driven a certain distance into the stone should be quickly withdrawn or the movement of the machine will cause them to impinge against the uncut stone at their front and produce strain and rapid wear on the propelling mechanism. This obvious objection I overcome by using the straight lever in connection with the movable fulcrum. It will be seen that the blow is struck when the crank-pin reaches the top of the disk and picks its drills up as soon as the crank passes to the other side and begins to descend, or on one-eighth of a revolution. With a fixed fulcrum the lowering of the drills is at the expense of the stroke—that is, to lower four inches it shortens the stroke four inches. Consequently the blow would be delivered when the crank-pin reaches one-half of the upward turn of the disk or crank pin, and the drills remain on the rock until the crank-pin passes to the opposite side of the disk on its downward stroke. Thus it will be seen that a double-gang machine working two sets of drills at one time would have one or the other resting on the rock all the time, impeding the progress of the machine along the track.

Again, by means of the movable fulcrum and the straight levers I am enabled to get a regular eight-inch stroke at all times, whatever the depth at which the machine is working. This is of great advantage when, as in sandstone, there is rapid wear at the corners and lower edges of the drills, and the drills which start in with a two-and-one-half-inch breadth of blade comparatively soon wear to a cutting-width of, say, two inches, forming a channel with sides converging toward the bottom. Now if I were to set my drills down so as to reach the lower plane of work and started with a four-inch stroke working toward an eight-inch stroke, and the drills were thus tapered to a narrow cutting-edge, it will be seen that they would not have fall enough to overcome the friction on the walls of the channel and still do effective work at the bottom; but by reason of the eight-inch stroke afforded by my construction I can grind the walls away with the edges of the drills and also have sufficient momentum to drive the drills into the channel to cut about the usual depth. This in the end effects a great saving in time and greatly facilitates operation.

Having thus described the invention, what I claim as new, and desire to secure by Letters Patent, is—

1. In a channeling-machine, a sectional lever having pivotal connection at the abutting ends of the sections and connected with operating mechanism at one end and carrying channeling-drills at its other end, in combination with a vertically-adjustable fulcrum on which the lever is pivoted, substantially as described.

2. In a channeling-machine, a lever for operating drills, formed in sections pivoted together, and springs near the joint of said sections common to both sections, in combination with the power-shaft at one end of the machine, connecting with one end of the lever, and the drills at the other end of the machine, connected with the other end of the lever. and an adjustable fulcrum on which said lever is pivoted, substantially as described.

3. In a channeling-machine, the combination, with a pivoted drill-carrying lever formed of sections which are aligned and pivoted together at their abutting ends, of a leaf-spring arranged parallel thereto and spanning the joint between the sections and connected thereto at its respective ends, substantially as described.

4. In a channeling-machine, the combination, with the drill-carrying lever made of two aligned abutting sections pivoted together, of a fulcrum on which the longer section of said lever is pivoted, a leaf-spring arranged beneath the fulcrum and extending an equal distance each way therefrom and beneath the joint of the lever-sections in line with the same, and shackles which connect the ends of the spring with the respective lever-sections, as shown and described.

5. In a channeling-machine, the combination, with a lever made up of sections 37 and 53, formed, respectively, with bearing faces or shoulders 4 and 3 and connected by a pivot or pintle 2, of an adjustable fulcrum upon which the lever is mounted, a crank-shaft, crank or wrist pins carried thereby, blocks arranged in longitudinal slots formed in the lever-sections 37, the crank-pins engaging said blocks, a drill-carrying box mounted in vertical guides and provided with a stud or pin which rides in a slot formed in the lever-section 53, and a spring 60, arranged beneath the lever and connected to the lever-sections by shackles 61, substantially as described.

6. In a channeling-machine, the combination, with a crank-shaft provided with a wrist-pin, of a block with which said wrist-pin engages, a lever-section 37, formed with a longitudinal slot 36, in which the block rides, a lever-section 53, pivotally connected to the section 37, the sections 37 and 53 being formed with abutting bearing-faces 4 and 3, a fulcrum-pin 38, upon which the lever is mounted, a means, substantially as described, for adjusting said fulcrum-pin, a spring arranged beneath the lever and connected to the lever-sections by shackles 61, a drill-carrying block, ways in which said block is mounted, and a stud or pin extending from the block and riding in a longitudinal slot formed in the lever-section 53, substantially as described.

7. In a channeling-machine, the combination, with a drill-carrying lever and a means for rocking the same, of a fulcrum-pin upon which the lever is mounted, a block 39, arranged to support the fulcrum-pin, a threaded shank extending upward from said block, a plate supported above the lever and provided with ratchet-teeth, the threaded shank passing through said plate, a nut engaging the threaded shank above the plate, a pawl carried by said nut and arranged to engage the ratchet, and a jam-nut carried by the shaft below the ratchet-plate, substantially as described.

WILLIAM HENRY BRYANT.

Witnesses:
J. F. YARICK,
H. K. CLOCK.